United States Patent [19]
Gu

[11] Patent Number: 4,776,077
[45] Date of Patent: Oct. 11, 1988

[54] METHOD OF MAKING A THRUST BEARING UNDERSPRING

[75] Inventor: Alston L. Gu, Rancho Palos Verdes, Calif.

[73] Assignee: Allied-Signal, Inc., Los Angeles, Calif.

[21] Appl. No.: 10,049

[22] Filed: Feb. 2, 1987

Related U.S. Application Data

[62] Division of Ser. No. 811,972, Dec. 19, 1985, Pat. No. 4,682,900.

[51] Int. Cl.$^4$ .............................................. B23P 13/00
[52] U.S. Cl. ................................ 29/173; 29/149.5 C; 156/645; 156/654; 156/656; 156/659.1; 156/664

[58] Field of Search ............ 29/173, 149.5 C, 149.5 S; 72/379; 384/105, 106; 156/645

[56] References Cited

U.S. PATENT DOCUMENTS

| | | | |
|---|---|---|---|
| 4,227,753 | 10/1980 | Wilcock | 384/105 |
| 4,400,861 | 8/1983 | Parker | 29/173 |
| 4,624,583 | 11/1986 | Saville et al. | 384/105 |

Primary Examiner—P. W. Echols
Attorney, Agent, or Firm—Albert J. Miller; J. Henry Muetterties; David B. Abel

[57] ABSTRACT

A method of forming an underspring for a foil thrust bearing from a uniform thickness sheet. The underspring is formed by chemically etching a plurality of slots in the disk and then stamping the tabs formed by the slots.

18 Claims, 2 Drawing Sheets 4,776,077

METHOD OF MAKING A THRUST BEARING UNDERSPRING

This is a division of application Ser. No. 811,972 filed Dec. 19, 1985 now U.S. Pat. No. 4,682,900.

BACKGROUND OF THE INVENTION

Process fluid or gas bearings are now being utilized in an increasing number of diverse applications. These fluid bearings generally comprise two relatively movable elements with a predetermined spacing therebetween filled with a fluid such as air, which, under dynamic conditions, form a supporting wedge sufficient to prevent contact between the two relatively movable elements.

More recently, improved fluid bearings, particularly gas bearings of the hydrodynamic type, have been developed by providing foils in the space between the relatively movable bearing elements. Such foils, which are generally thin sheets of a compliant material, are deflected by the hydrodynamic film forces between adjacent bearing surfaces and the foils thus enhance the hydrodynamic characteristics of the fluid bearings and also provide improved operation under extreme load conditions when normal bearing failure might otherwise occur. Additionally, these foils provide the added advantage of accommodating eccentricity of the relatively movable elements and further provide a cushioning and dampening effect.

The ready availability of relatively clean process fluid or ambient atmosphere as the bearing fluid makes these hydrodynamic, fluid film lubricated, bearings particularly attractive for high speed rotating machinery. While in many cases the hydrodynamic or self-acting fluid bearings provide sufficient load bearing capacity solely from the pressure generated in the fluid film by the relative motion of the two converging surfaces, it is sometimes necessary to externally pressurize the fluid between the bearing surfaces to increase the load carrying capability. While these externally pressurized or hydrostatic fluid bearings do increase the load carrying capacity, they do introduce the requirement for an external source of clean fluid under pressure.

In order to properly position the compliant foils between the relatively movable bearing elements, a number of mounting means have been devised. In thrust bearings, it is conventional practice to mount a plurality of individually spaced foils on a foil bearing disk such as by spot welds and position the foil bearing disk on one of the bearing elements as exemplified in U.S. Pat. No. 3,635,534. Alternately a compliant unitary foil, such as illustrated in U.S. Pat. No. 4,247,155, has been proposed.

To establish stability of the foils in most of these mounting means, a substantial pre-load is required on the foil. That is, the individual foils must be loaded against the relatively movable bearing element opposed to the bearing element upon which the foils are mounted. It has been conventional to provide separate compliant stiffener elements or undersprings beneath the foils to supply this required preload as exemplified in U.S. Pat. Nos. 3,893,733 and 4,153,315.

SUMMARY OF THE INVENTION

In the present invention, the foil thrust bearing is provided with a thrust bearing underspring stamped from a uniform thickness sheet. A plurality of spring bumps are formed in an underspring disk to provide improved load capacity and distribution.

DESCRIPTION OF THE PREFERRED EMBODIMENTS

Figure 1:
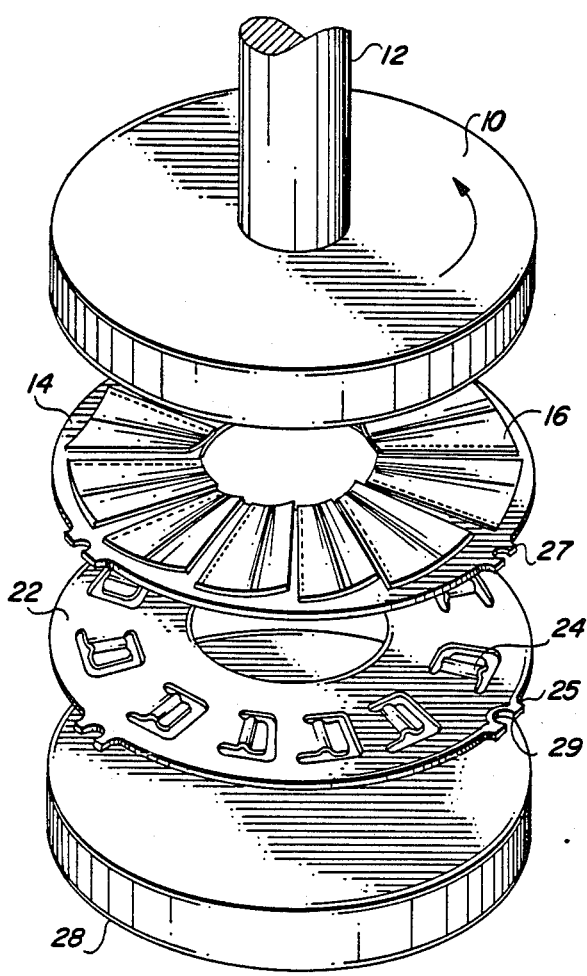
FIG. 1 is an exploded perspective view of a foil thrust bearing of the present invention.

As illustrated in FIG. 1, the thrust runner 10, including shaft 12, is rotatably supported on the thrust plate 28 by means of the thrust bearing disk 14 and thrust bearing stiffener or underspring 22. The thrust bearing disk 14 includes a plurality of compliant foils 16 while the thrust bearing underspring 22 includes a plurality of bumps 24 thereon to provide stiffness for the thrust bearing disk 14. The underspring 22 may include outer projections 25 having cutouts 29 which can be utilized to maintain the position of the underspring 22 with respect to the thrust plate 28. Similar projections 27 may be spaced around the thrust bearing disk 14.

Figure 2A:
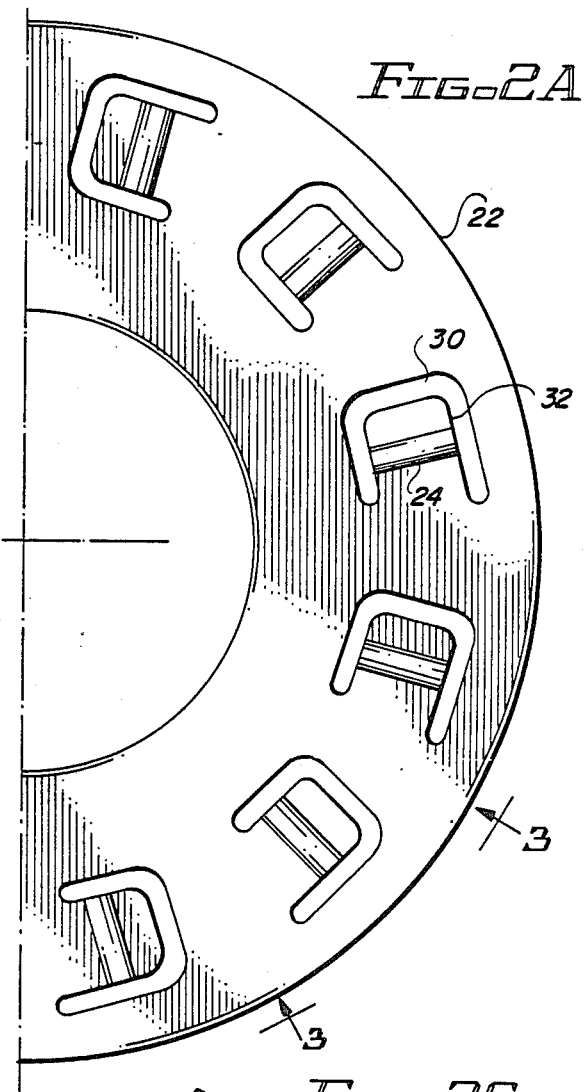
FIG. 2A is an enlarged partial top plan view of the thrust bearing underspring of the foil thrust bearing of FIG. 1.
Figure 2B:
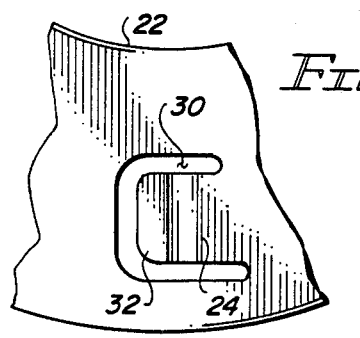
FIG. 2B is an enlarged partial bottom plan view of the thrust bearing underspring of FIG. 2A.
Figure 2C:
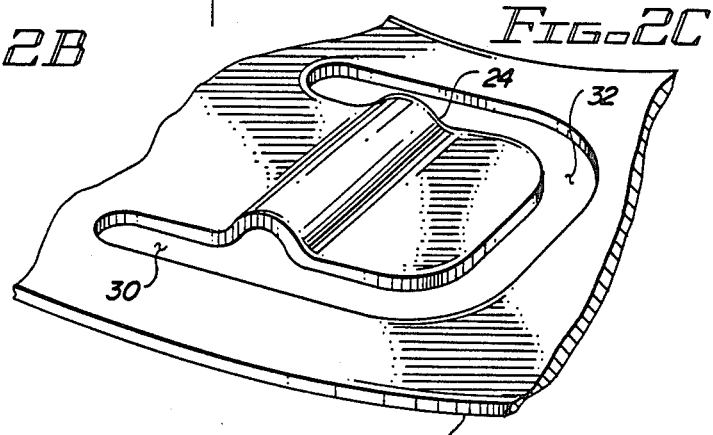
FIG. 2C is an enlarged perspective view of an individual bump of the thrust bearing underspring of FIG. 2A.
Figure 3:
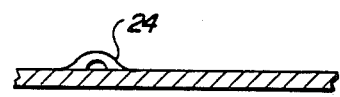
FIG. 3 is an edge view of the thrust bearing underspring of FIG. 2A taken along line 3—3 thereof.

As more fully shown in FIGS. 2A-3, the thrust bearing underspring 22 generally comprises a thin compliant ring disk having a thickness generally between 0.001 inches and 0.030 inches. A plurality of generally U-shaped slots 30, with the open ends thereof facing away from the direction of rotation of the thrust runner 10, extend through the entire thickness of the underspring 22. Each of these generally U-shaped slots 30 forms a tab 32 having its free end facing in the direction of rotation of the thrust runner 10. The bumps 24, which are generally radially extending, are formed by stamping on these tabs 32.

The number of U-shaped slots and hence the number of tabs is equal to the number of thrust bearing foils 16 on the thrust bearing disk 14 with an individual tab disposed generally beneath an individual foil. The height of the bumps 24 is generally between 0.003 inches to 0.060 inches. The radial length of the bump would depend upon the size of the bearing and would generally be between 0.2 inches to 8 inches.

Figure 5:
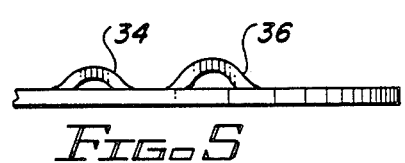
FIG. 5 is an edge view of the thrust bearing underspring of FIG. 4 taken along line 5—5 thereof.
Figure 4:
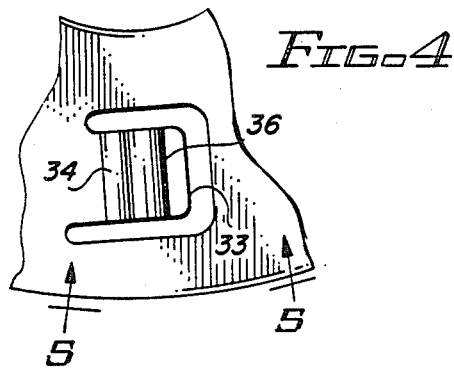
FIG. 4 is an enlarged partial top plan view of an alternate thrust bearing underspring of the present invention.

As illustrated in FIGS. 4 and 5, the tab 33 may include more than a single bump, such as the two bumps 34 and 36. Likewise, the bump 36 closest to the free end of the tab 33 may have a height greater than the height of the bump 34 closer to the base of the tab 33. The height of the bump 36 would generally be between 0.0005 inches and 0.030 inches greater than the height of the bump 34.

Figure 6:
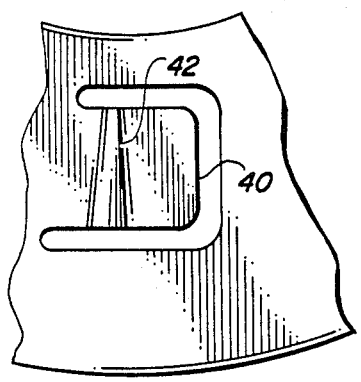
FIG. 6 is an enlarged partial top plan view of another alternate thrust bearing underspring of the present invention.

FIG. 6 illustrates a tab 40 having a bump 42 in which the width of the bump increases radially. It should be recognized for purposes of illustration the radial divergence of the bump 42 is shown as exaggerated. The sides of the bump 42 would generally be radial lines.

Figure 7A:
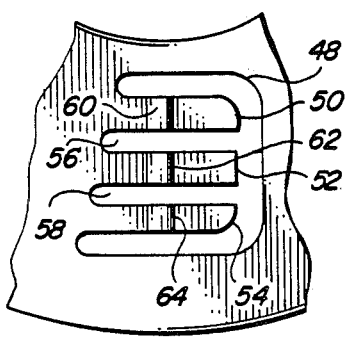
FIG. 7A is an enlarged partial top plan view of yet another alternate thrust bearing underspring of the present invention.
Figure 7B:
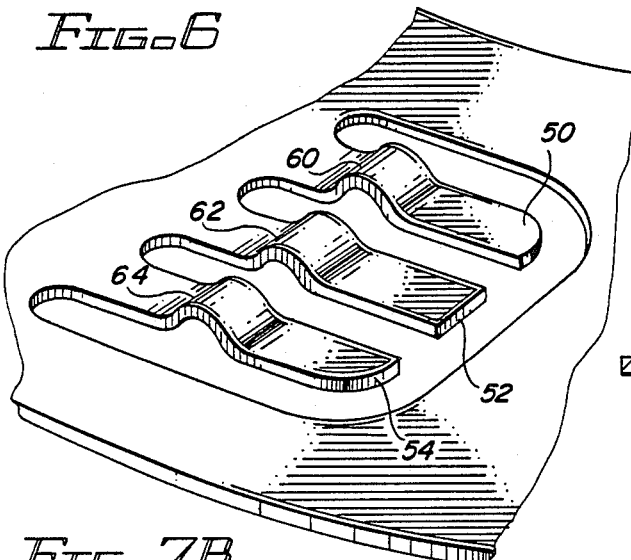
FIG. 7B is an enlarged partial perspective view of the thrust bearing underspring of FIG. 7A.

As illustrated in FIGS. 7A and 7B, the tab produced by U-shaped slot 48 may be divided into mroe than one prong, for example, inner prong 50, middle prong 52 and outer prong 54 by means of an inner slot 56 and outer slot 58. This arrangement produces an inner bump 60, middle bump 62, and outer bump 64, each of which are generally radially aligned.

Figure 11:
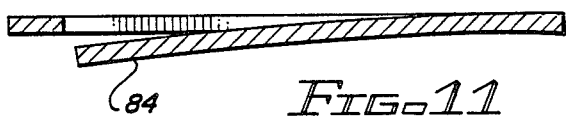
FIG. 11 is a sectional view of an alternate downwardly extending tab.
Figure 8:
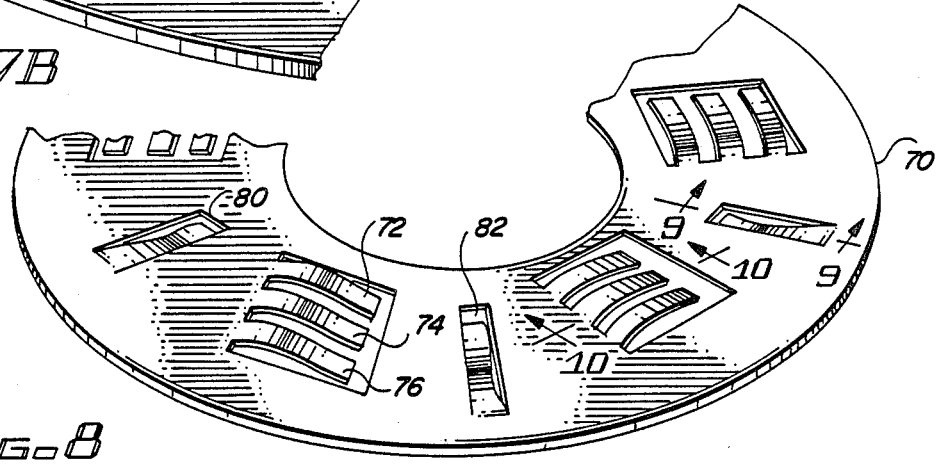
FIG. 8 is an enlarged partial perspective view of a further alternate thrust bearing underspring of the present invention.
Figure 9:
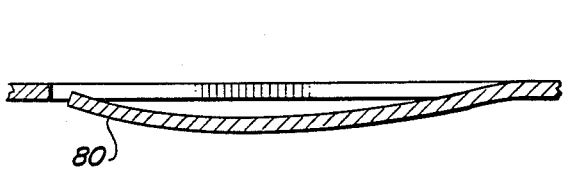
FIG. 9 is a sectional view of the thrust bearing underspring of FIG. 8 taken along line 9—9 thereof.
Figure 10:
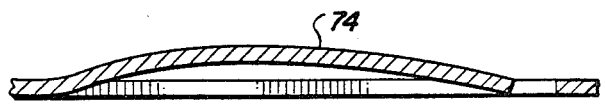
FIG. 10 is a sectional view of the thrust bearing underspring of FIG. 8 taken along line 10—10 thereof.

An alternate underspring 70 is illustrated in FIGS. 8-11. Underspring 70 includes a plurality of upwardly extending tabs, each having an inner prong 72, middle prong 74, and outer prong 76. Each of the prongs has a generally arcuate or curved shape. Also included in underspring 70 are a plurality of downwardly extending tabs 80 formed in radially extending slots 82. The tabs 80 may also be arcuate or curved in shape as shown in FIG. 9 or the tabs 84 may be straight as shown in FIG. 11.

While existing chemically etched undersprings are difficult to produce in a highly repeatable manner due to the difficulty in controlling the critical thickness dimensions, undersprings stamped in accordance with the present invention utilizing a constant thickness sheet material consistently produce the series of shallow bumps in a highly repeatable manner. This not only results in a much less complex manufacturing process but provides greater control and better load capacity for the underspring. By slotting the tabs, even more load distribution can be produced in the radial direction. Under load conditions the bumps deform to yield a greater support area for the thrust bearing foil and thus generate higher load capacity.

Good bearing damping is also achieved when the bump flares under load and the free end of the tab stretches and rubs against the bearing structure. The bump is generally quite stiff in order to provide good load capacity. The downwardly extending tabs are much less stiff or weaker than the upwardly extending tabs and are utilized to provide proper preload in the bearing assembly. The upwardly extending tabs, which provide primary stiffness for the bearing, generally have a stiffness at least $10^2$ times greater than the stiffness of the downwardly extending tabs and this stiffness may be as great as $10^5$ times greater. In other words, in operation the downwardly extending tabs will yield or deform under load before any yielding or deformation of the upwardly extending tabs.

While specific embodiments of the invention have been illustrated and described, it is understood that these are provided by way of example only. While the invention is shown as a thrust bearing, it should be readily apparent that it is equally applicable to a conical bearing which has a thrust component. The invention is to be construed as being limited only by the proper scope of the following claims.

I claim:

1. A method of forming an underspring for a foil thrust bearing having a compliant foil bearing operably disposed between a thrust plate and a thrust runner rotatably supported by the thrust plate and with the compliant foil bearing including a thrust disk having a plurality of converging surface individual compliant foils disposed towards the thrust runner with the underspring providing preload and stiffness for the bearing, said method comprising the steps of:

forming a uniform thickness compliant ring disk;
   forming a first plurality of generally U-shaped slots in said disk, said slots having open ends facing away from the direction of rotation of said thrust runner, to produce a first plurality of tabs having free ends facing in the direction of rotation of said thrust runner;
   forming a second plurality of slots defining a second plurality of tabs; and
   stamping said first plurality of tabs to form an arcuate curvature thereto with repect to the surface of said compliant ring disk in the direction of said thrust disk and to bend said second plurality of tabs away from the opposite surface of said ring disk.

2. A method of forming an underspring for a foil thrust bearing having a compliant foil bearing operably disposed between a thrust plate and a thrust runner rotatably supported by the thrust plate and with the compliant foil bearing including a thrust disk having a plurality of converging surface individual compliant foils disposed towards the thrust runner with the underspring providing preload and stiffness for the bearing, said method comprising the steps of:

forming a uniform thickness compliant ring disk;
   forming a plurality of generally U-shaped slots in said disk, said slots having open ends facing away from the direction of rotation of said thrust runner, to produce a plurality of tabs having free ends facing in the direction of rotation of said thrust runner; and
   forming a second plurality of slots defining a second plurality of tabs; and
   stamping said ring disk to form at least one radially extending bump across said first tabs and to bend said second tabs in the opposite direction from said bump of said first tabs.

3. The method of claim 2 wherein said stamping step forms two radially extending bumps across said tabs.

4. A method of forming an underspring for a foil thrust bearing having a compliant foil bearing operably disposed between a thrust plate and a thrust runner rotatably supported by the thrust plate and with the compliant foil bearing including a thrust disk having a plurality of converging surface individual compliant foils disposed towards the thrust runner with the underspring providing preload and stiffness for the bearing, said method comprising the steps of:

forming a uniform thickness compliant ring disk having opposed flat surfaces;
   chemically etching a first plurality of generally U-shaped slots in said disk and at least one slot extending parallel to the legs of the U-shaped slot from the open end of the U-shaped slot towards the base thereof to form a first plurality of tabs having at least two prongs facing in the direction of rotation of said thrust runner, and a second plurality of slots in said disk to form a second plurality of tabs, each of said second plurality of tabs radially aligned and interspersed with said first plurality of tabs; and stamping said ring disk to form on each prong of said first plurality of tabs at least one radially extending bump across each prong, said bump extending out of one surface of said disk, and to bend said second plurality of tabs away from the opposite surface of said disk.

5. The method of claim 4 wherein each of said first plurality of tabs includes two radially extending bumps thereacross.

6. The method of claim 5 wherein said stamping step includes forming a first radially extending bump across each prong disposed near the free end thereof and a second radially extending bump across each prong disposed near the base thereof.

7. The method of claim 4 wherein the first plurality of tabs are formed having a greater stiffness than the stiffness of the second plurality of tabs.

8. The method of claim 7 wherein the first plurality of tabs are formed having a stiffness at least $10^2$ times greater than the stiffness of the second plurality of tabs.

9. The method of claim 7 wherein the first plurality of tabs are formed having a stiffness between $10^2$ and $10^5$ times greater than the stiffness of the second plurality of tabs.

10. A method of forming an underspring for a foil thrust bearing comprising the steps of:

providing a uniform thickness compliant ring disk;

chemically etching a plurality of generally U-shaped slots in said disk to form a plurality of tabs on said disk with each tab having at least two prongs; and stamping said disk to form a generally arcuate shape to each of the prongs formed by the U-shaped slots.

11. A method of forming an underspring for a foil thrust bearing comprising the steps of:

providing a uniform thickness compliant ring disk;

chemically etching a first plurality of generally U-shaped slots in said disk to form a first plurality of tabs on said disk and a second plurality of slots in said disk configured to form a second plurality of tabs on said disk extending radially to said disk and transverse to said first plurality of tabs, said first plurality of tabs interspersed with said second plurality of tabs; and stamping said disk to form a generally arcuate shape to each of said second plurality of tabs and to form a radially extending bump across said first plurality of tabs.

12. The method of claim 14 wherein said stamping step forms the radially extending bumps to outwardly radially diverge.

13. The method of claim 12 wherein said stamping step forms the radially extending bumps with radial lines.

14. The method of claim 11 wherein said stamping step additionally forms two spaced radially extending bumps on each of said first plurality of tabs formed by said first plurality of generally U-shaped slots.

15. The method of claim 14 wherein said stamping step includes forming said two spaced radially extending bumps having differing heights from said ring disk.

16. A method of forming an underspring for a foil thrust bearing comprising the steps of:

providing a uniform thickness compliant ring disk;

chemically etching a first plurality of generally U-shaped slots in said disk to form a first plurality of tabs on said disk and a second plurality of slots in said disk to form a second plurality of tabs on said disk extending transverse to said first plurality of tabs, said first plurality of tabs interspersed with said second plurality of tabs and said second plurality of tabs having at least two prongs; and stamping said disk to form a general arcuate shape to each of said second plurality of tabs and to form a radially extending bump to said first plurality of tabs in a direction opposed to the arcuate shape formed on said first plurality of tabs.

17. The method of claim 16 wherein said stamping step additionally forms two spaced radially extending bumps on each of said prongs.

18. The method of claim 17 wherein said stamping step includes forming said two spaced radially extending bumps having differing heights from said ring disk.

* * * * *